(12) United States Patent
Kato et al.

(10) Patent No.: US 10,753,423 B2
(45) Date of Patent: Aug. 25, 2020

(54) CONNECTOR AND SHIELDING BODY

(71) Applicant: NICHIAS CORPORATION, Tokyo (JP)

(72) Inventors: Tadakatsu Kato, Tokyo (JP); Ichiro Raita, Tokyo (JP); Sakae Mishina, Tokyo (JP); Koki Enami, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 488 days.

(21) Appl. No.: 15/547,226

(22) PCT Filed: Jan. 6, 2016

(86) PCT No.: PCT/JP2016/000041
§ 371 (c)(1),
(2) Date: Jul. 28, 2017

(87) PCT Pub. No.: WO2016/121297
PCT Pub. Date: Aug. 4, 2016

(65) Prior Publication Data
US 2018/0023657 A1 Jan. 25, 2018

(30) Foreign Application Priority Data
Jan. 30, 2015 (JP) .................................. 2015-017525

(51) Int. Cl.
*F16F 15/067* (2006.01)
*F16F 3/04* (2006.01)
(Continued)

(52) U.S. Cl.
CPC ............ *F16F 15/067* (2013.01); *B60R 13/08* (2013.01); *F01N 13/10* (2013.01); *F01N 13/1811* (2013.01); *F16F 3/04* (2013.01)

(58) Field of Classification Search
CPC .......... F16F 15/06; F16F 15/067; F16F 15/02; F16F 15/04; F16F 3/04; B60R 13/0876;
(Continued)

(56) References Cited

U.S. PATENT DOCUMENTS 2,841,388 A 7/1958 Hehn
4,033,542 A * 7/1977 Moehle ................ B60G 99/002
248/601

(Continued)

FOREIGN PATENT DOCUMENTS

CN 2592954 12/2003
CN 101307811 11/2008
(Continued)

OTHER PUBLICATIONS

Search Report issued in EP Appln. No. 16742906.7 dated Oct. 15, 2018.
(Continued)

*Primary Examiner* — Jonathan P Masinick
(74) *Attorney, Agent, or Firm* — Nixon & Vanderhye P.C.

(57) ABSTRACT

A connector (1) that comprises first and second surfaces (20a) and (30a) disposed opposingly with an interval therebetween, said interval allowing the shielding body 100 to be inserted therein; a pressing member (4) having a through hole (40) and formed so as to be capable of extending and contracting by winding a prescribed wire material spirally around the through hole (40) as center such that a curvature thereof varies continuously around the through hole; and a holding part (31) that is inserted into a hole (103) formed in the shielding body and the through hole (40) and maintains a specific distance between the first and second surfaces (20a, 30a); wherein the pressing member (4a) and (4b) comprises: a first pressing member (4a) disposed between the first surface (20a) and the shielding body (100) such that (Continued)

a small-curvature side thereof in the extension and contraction direction faces the shielding body (100); and a second pressing member (4b) disposed between the second surface (30a) and the shielding body (100) such that a small-curvature side thereof in the extension and contraction direction faces the shielding body (100). Due to such a configuration, vibration from the vibrating body (10) is absorbed and transmission of the vibration to the shielding body (100) can be suppressed.

4 Claims, 16 Drawing Sheets

(51) Int. Cl.
  *B60R 13/08* (2006.01)
  *F01N 13/10* (2010.01)
  *F01N 13/18* (2010.01)

(58) Field of Classification Search
  CPC .... F01N 13/10; F01N 13/102; F01N 13/1811; F01N 13/1805; F01N 13/1822; F16B 5/02; F16B 5/0241
  See application file for complete search history.

(56) References Cited

U.S. PATENT DOCUMENTS

| | | | | |
|---|---|---|---|---|
| 4,079,926 A | | 3/1978 | Nunes | |
| 5,344,291 A | * | 9/1994 | Antkowiak | F04D 13/021 415/131 |
| 5,595,371 A | * | 1/1997 | Hukuda | F16F 15/067 267/34 |
| 7,065,963 B2 | * | 6/2006 | Niwa | B60R 13/0876 165/72 |
| 7,273,128 B2 | * | 9/2007 | Niwa | B60R 13/0876 181/207 |
| 7,284,748 B2 | | 10/2007 | Mishima | |
| 7,398,655 B2 | * | 7/2008 | Yun | F16F 15/067 181/403 |
| 8,104,573 B2 | * | 1/2012 | Oxenknecht | B60R 13/0876 181/200 |
| 8,899,376 B2 | * | 12/2014 | Akimoto | F01N 13/10 181/207 |
| 9,353,825 B2 | * | 5/2016 | Murayama | F16F 15/085 |
| D777,015 S | * | 1/2017 | Deveci | D8/349 |
| 10,442,502 B2 | * | 10/2019 | Norrman | F16F 15/067 |
| 10,443,670 B2 | * | 10/2019 | Nishizawa | B60N 2/90 |
| 2004/0075203 A1 | * | 4/2004 | Cable | B65G 27/18 267/180 |
| 2005/0028519 A1 | * | 2/2005 | Ishiwa | F01N 13/102 60/323 |
| 2005/0028963 A1 | | 2/2005 | Niwa | |
| 2005/0140075 A1 | * | 6/2005 | Mishima | F01N 13/14 267/140.11 |
| 2006/0157976 A1 | * | 7/2006 | Paterson | F01N 13/1811 285/268 |
| 2007/0252315 A1 | | 11/2007 | Mishima | |
| 2007/0252316 A1 | | 11/2007 | Mishima | |
| 2010/0101528 A1 | * | 4/2010 | Fonville | F02B 77/13 123/198 E |
| 2013/0034377 A1 | | 2/2013 | Friedow et al. | |
| 2013/0241122 A1 | | 9/2013 | Akimoto | |
| 2014/0223972 A1 | * | 8/2014 | Jackson | D06F 37/20 68/23.1 |

FOREIGN PATENT DOCUMENTS

| | | |
|---|---|---|
| CN | 102985719 | 3/2013 |
| DE | 10 2004 033 552 | 2/2005 |
| GB | 439667 | 12/1935 |
| JP | 6-323363 | 11/1994 |
| JP | 2003-269532 | 9/2003 |
| JP | 2004-169733 | 6/2004 |
| JP | 2005-30570 | 2/2005 |
| JP | 2013-130139 | 7/2013 |

OTHER PUBLICATIONS

International Preliminary Resprt on Patentability issued in PCT/JP2016/000041 dated Aug. 1, 2017.
International Search Report issued in PCT/JP2016/000041 dated Feb. 16, 2016.
Office Action issued in CN Appln. No. 201680007897.8 dated Jul. 4, 2018 (w/ partial translation).
Manual for Mechanical Design, Cheng Daxia, Article 7, Chapter 2 pp. 7-8 and Chapter 3 pp. 7-56, Chemical Industry Press, Jan. 2004 dated Jan. 31, 2004.

* cited by examiner

Fig.7A

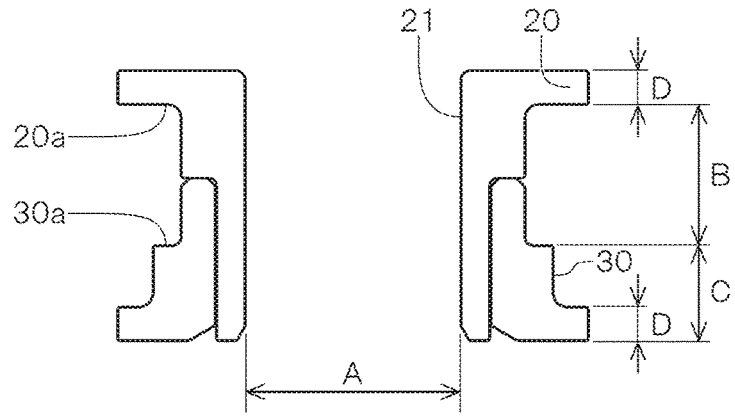

Fig.7B

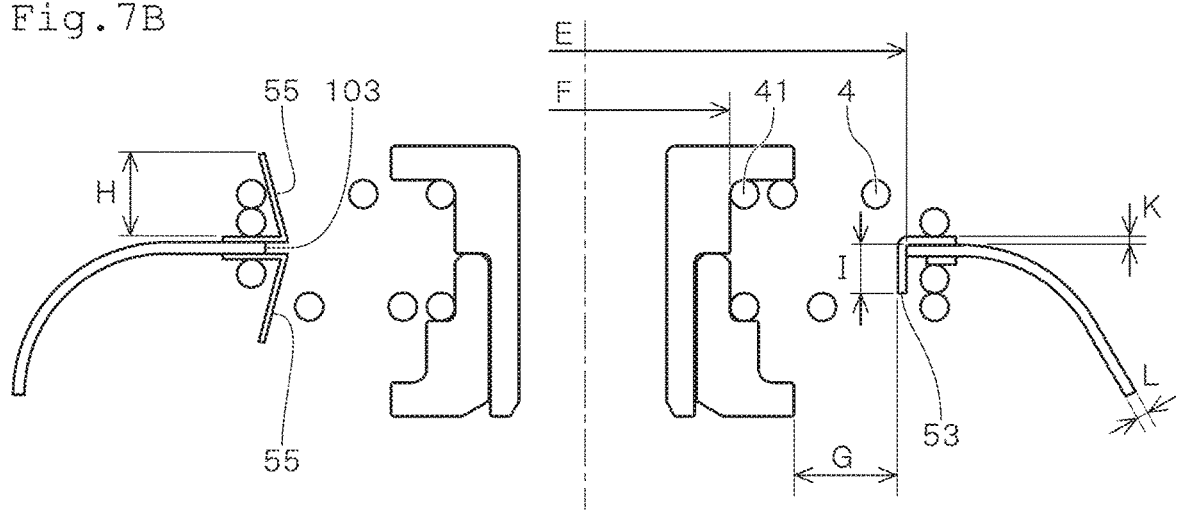

Fig.7C

| Numerical symbol | Name | Design value | Remarks (preferable value) |
|---|---|---|---|
| A | Diameter of hole 21 | Appropriate | |
| B | Distance between surface 20a and surface 30a | 5mm | B ≧ height when spring 4 is compressed (4 mm) + K x 2 + L |
| C | Thickness of flange 30 | 3.4mm | Distance C from vibrating body 10 to the surface 30a ≧ 3.0 mm |
| D | Thickness of flange 20 | Appropriate | |
| E | Hole diameter of mounting hole 103 | Appropriate | |
| F | Hole diameter of through hole 40 on the end side 41 of the spring 4 | Appropriate | |
| G | Inner radius of spacer 5 – outer radius of flange part | 3.4mm | G ≧ 3.0mm |
| H | Height of spring supporting part 55 | Appropriate | |
| I | Height of wall part 53 | Appropriate | |
| J | Height of spring 4 in the no-load state | 6.0mm | J ≧ height when spring 4 is compressed (2 mm) + 3.0 mm |
| K | Thickness of spacer 5 | Appropriate | |
| L | Thickness of shielding body 100 | Appropriate | |

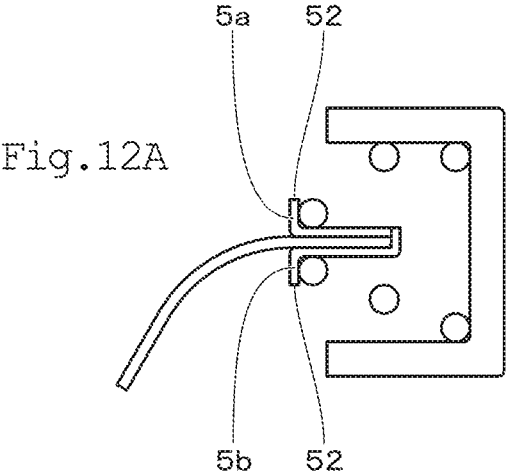
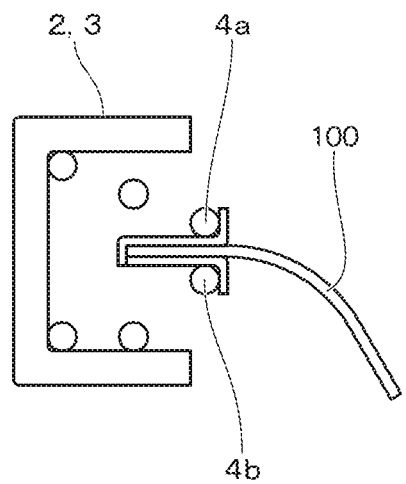
Fig.12A
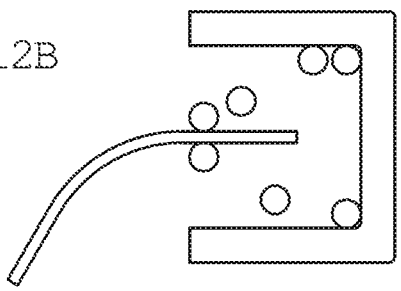
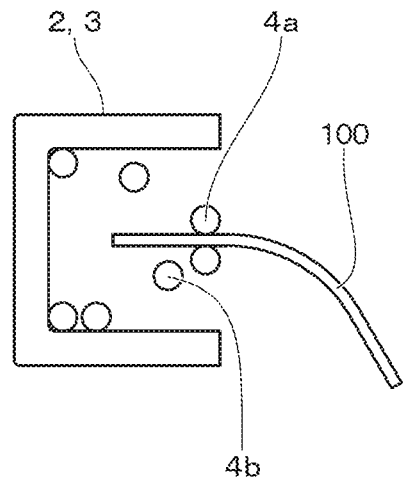
Fig.12B

CONNECTOR AND SHIELDING BODY

This application is the U.S. national phase of International Application No. PCT/JP2016/000041 filed Jan. 6, 2016 which designated the U.S. and claims priority to JP Patent Application No. 2015-017525 filed Jan. 30, 2015, the entire contents of each of which are hereby incorporated by reference.

TECHNICAL FIELD

The present invention relates to a connector provided in a connecting segment that connects a vibrating body that generates vibration and a plate-like shielding body that shields prescribed physical energy emitted from the vibrating body, and a shielding body provided with this connector. In particular, the present invention relates to a connector that suppress vibration transmitted from the vibrating body to the shielding body and a shielding body.

BACKGROUND

An engine, and an exhaust manifold or a turbocharger which is attached to the engine, etc. are vibration bodies that vibrate under influence of an engine or vibrate by themselves.

Various parts are mounted on such a vibrating body. As examples of a mounting part, for example, a shielding body called an exhaust manifold cover, a heat insulator or the like can be given.

In general, a shielding body is provided with two metal plates being arranged opposingly, and is configured such that physical energy emitted from the vibrating body such as heat and sound is shielded from being transmitted to other parts around the engine or to the outside a vehicle.

Such shielding body may be broken or may generate abnormal sounds when directly or indirectly affected by vibration from a vibrating body.

In order to avoid such adverse effects exerted by vibration, disclosed is a connector having an anti-vibration structure provided in a connecting segment that connects a vibrating body and a shielding body.

For example, in a connector disclosed in Patent Document 1, a grommet having a weight-adjusted weight member (mass damper) is interposed between a vibrating body and a shielding body, whereby vibration of a shielding body is suppressed.

RELATED ART DOCUMENT

Patent Document

Patent Document 1: JP-A-2004-169733

SUMMARY OF THE INVENTION

Problems to be Solved by the Invention

However, with conventional connectors, early damping of vibration can be achieved by the function as the damper of a weight (mass damper), but it was impossible to absorb vibration actively.

The present invention has been attained in order to solve these problems, and is aimed at providing a connector capable of absorbing vibration actively and a shielding body provided with such a connector.

Means for Solving the Problems

In order to attain the above-mentioned object, the connector of the present invention is a connector provided in a connecting segment that connects a vibrating body that generates vibration and a plate-like shielding body that shields physical energy emitted from the vibrating body, which comprises:

first and second surfaces disposed opposingly with an interval therebetween, said interval allowing the shielding body to be inserted therein;

a pressing member having a through hole and formed so as to be capable of extending and contracting by winding a prescribed wire material spirally around the through hole as center such that a curvature thereof varies continuously around the through hole; and a holding part that is inserted into a hole formed in the shielding body and the through hole and maintains a specific distance between the first and second surfaces; wherein the pressing member comprises:

a first pressing member disposed between the first surface and the shielding body such that a small-curvature side thereof in the extension and contraction direction faces the shielding body; and a second pressing member disposed between the second surface and the shielding body such that a small-curvature side thereof in the extension and contraction direction faces the shielding body.

Further, the shielding body of the present invention is a shielding body attached to a vibrating body that generates vibration and shields prescribed physical energy emitted from the vibrating body, comprising a connector provided between a connecting segment that connects the vibrating body and the shielding body, and the connector is the above-mentioned connector according to the present invention.

Advantageous Effects of the Invention

According to the connector and the shielding body provided with the connector of the present invention, vibration generated from a vibrating body is actively absorbed, whereby transmission of vibration to a shielding body can be suppressed.

BRIEF DESCRIPTION OF THE DRAWINGS

FIG. 3 (3A to 3B) is a cross sectional view of each of the first element and the second element, in which

FIG. 4 (4A to 4D) is a view of an annular element (spacer) according to one embodiment, in which

FIG. 5 (5A to 5D) is a view of an annular element (spacer) according to another embodiment, in which

FIG. 6 (6A to 6B) is a cross sectional view of a connector, in which

FIG. 7 (7A to 7C) is a dimensional view of the connector 1B according to another embodiment, in which FIG. 7A is a cross sectional view of the first element and the second element, FIG. 7B is a cross sectional view of the connector 1B according to another embodiment and FIG. 7C is a table showing the dimension of each part;

FIG. 11 (11A to 11B) is a cross sectional view of the connector 1D according to another embodiment, in which

FIG. 12 (12A to 12B) is a cross sectional view of the connector 1E according to another embodiment, in which FIG. 12A is a cross sectional view of the connector 1E-1 (including a spacer) and FIG. 12B is a cross sectional view of the connector 1E-2 (not including a spacer);

FIG. 14 (14A to 14B) is an explanatory view relating to the spring constant of the pressing element (compression coil spring), in which

FIG. 16 (16A to 16B) is a result of a test relating to vibration damping properties of the shielding body attached to the vibrating body (engine) through a connector, in which

MODE FOR CARRYING OUT THE INVENTION

Figure 1:
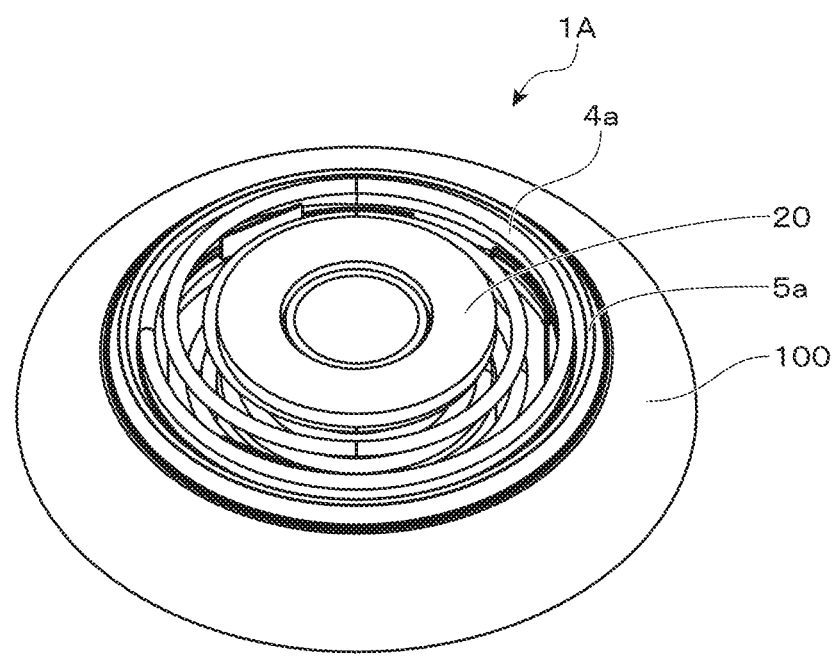
FIG. 1 is a perspective view of a connector 1A (including part of an shielding body) according to one embodiment.

Hereinbelow, a preferred embodiment of the connector and the shielding body according to the present invention will be explained with reference to FIGS. 1 to 16.

A connector 1 according to this embodiment is provided in a connecting segment that connects a vibrating body 10 such as an engine, an exhaust manifold attached thereto, a turbocharger or the like and a shielding body 100 attached thereon, and is configured such that it actively absorbs vibration emitted from the vibrating body 10, thereby to suppress transmission of the vibration to the shielding body 100.

Further, the shielding body 100 is configured such that an air layer that fills a gap formed between two metal plates serves as resistance, and shields transmission of physical energy such as sound and heat generated by vibration of the vibrating body 10 to other parts around an engine or to the outside of a vehicle.

Hereinbelow, the configuration of each of the connector 1 and the shielding body 100 will be explained.

[Connector]

As shown in FIGS. 1 to 8, the connector 1 (1A, 1B) according to this embodiment is provided with a first element 2, a second element 3, compression coil springs 4 (4a, 4b) and spacers 5 (5a, 5b), and is configured such that the shielding body 100 can be clamped between the spacers 5a and 5b.

In FIG. 1, FIG. 2, FIG. 6A to 6B, FIG. 7A to 7B and FIG. 8, only part of the shielding body 100 (the peripheral part of the mounting hole 103) is shown.

Figure 2:
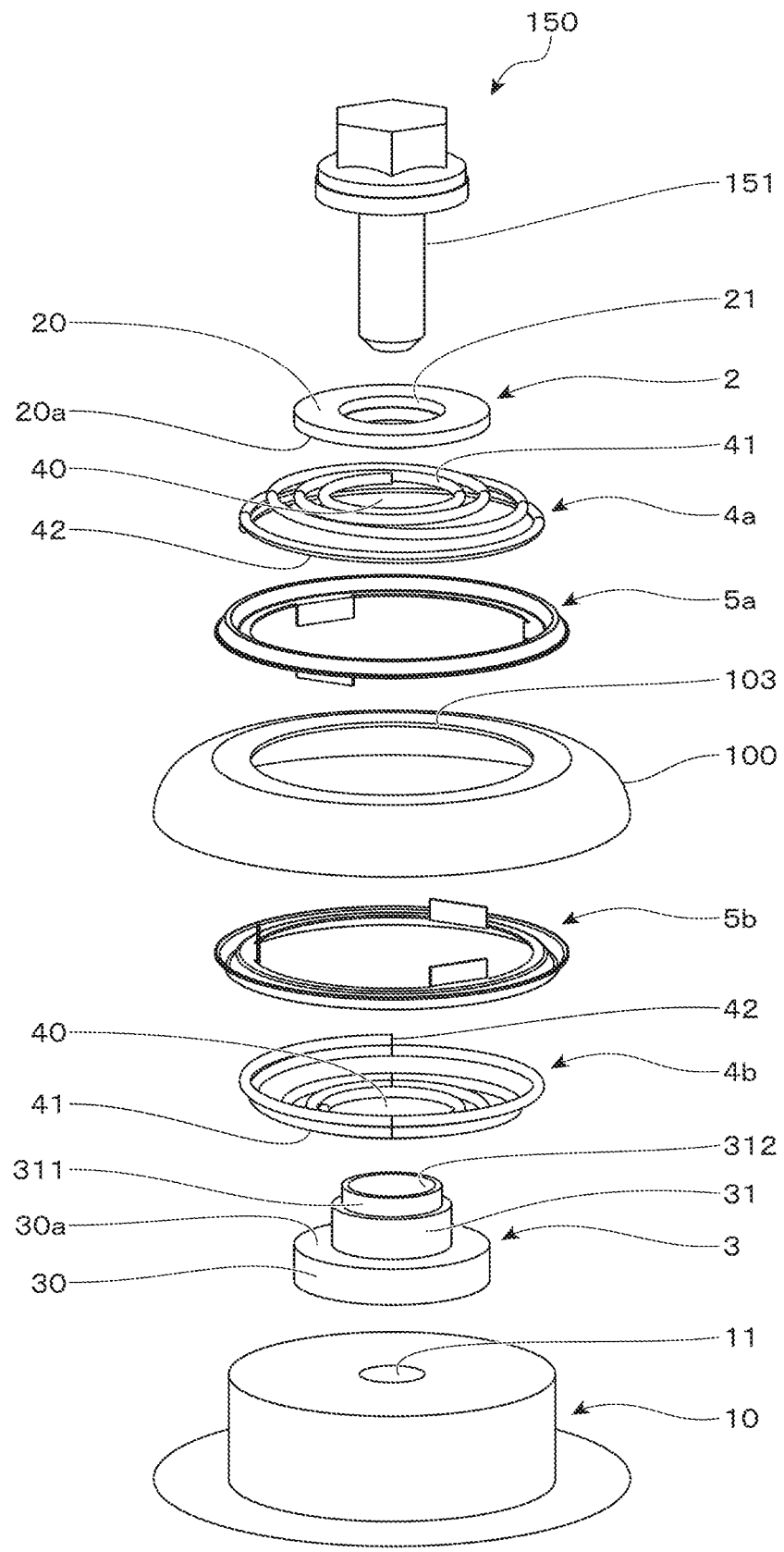
FIG. 2 is an exploded perspective view of the connector 1A.
Figure 3A:
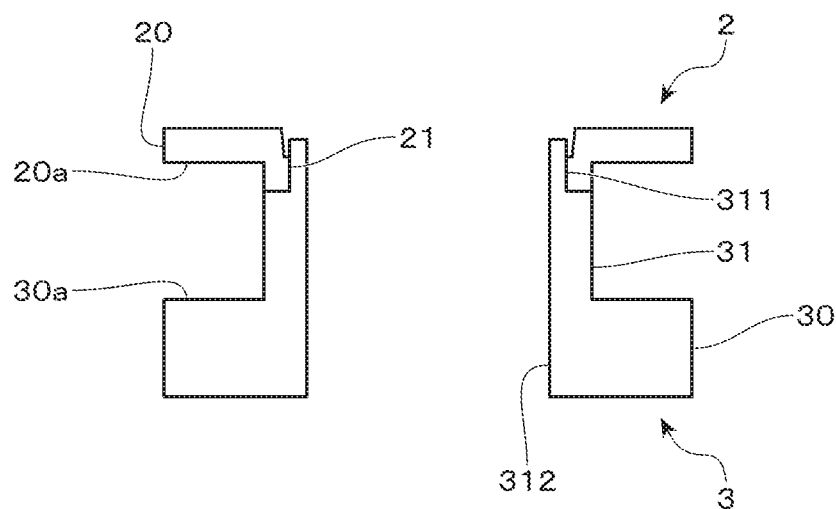
FIG. 3A is a cross sectional view of the first element and the second element according to one embodiment.
Figure 6A:
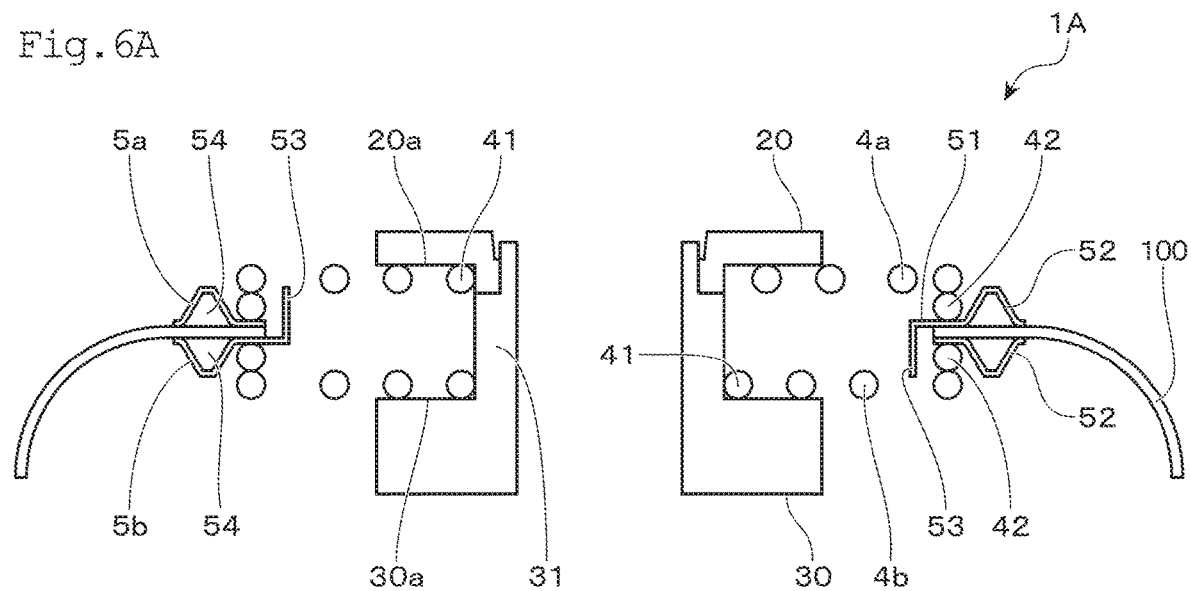
FIG. 6A is a cross sectional view of the connector 1A according to one embodiment.

The first element 2 and the second element 3 are made of a metal such as iron and stainless steel, for example, and have a bobbin-like assembled shape. As shown in FIGS. 2, 3A and 6A, between opposing two flange parts 20 and 30, a gap capable of inserting the compression coil springs 4a, 4b, the spacers 5a, 5b, and the shielding body 100 is provided.

The first element 2 is formed into a flat washer having the flange part 20 and a hole 21 formed at the center thereof, and is mounted by fitting on the second element 3.

The second element 3 has a rivet shape in which a hole 312 is formed at the center thereof, and is provided with a flange part 30 and a cylindrical body part 31. A stepped part 311 is formed on a distal end side of the body part 31, and the hole 21 of the first element 2 is fitted in the stepped part 311, whereby these elements are assembled into a bobbin-like shape.

Figure 3B:
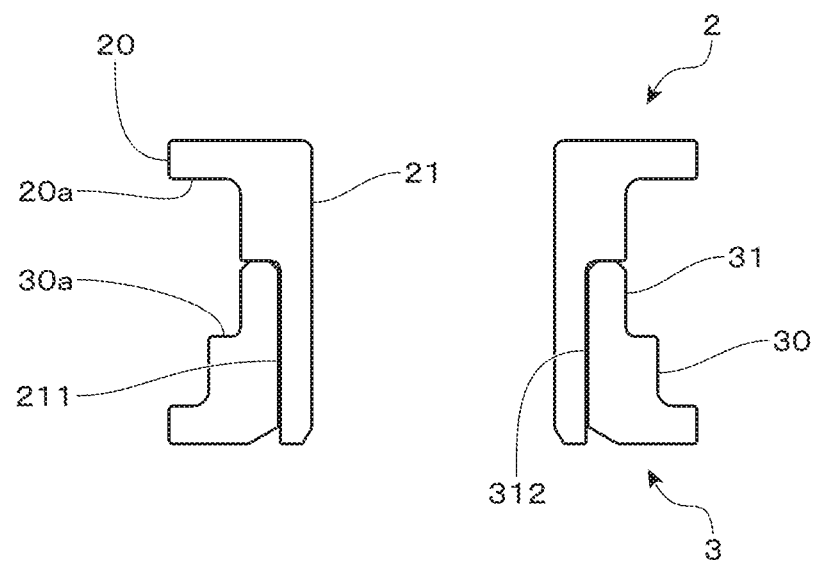
FIG. 3B is a cross sectional view of each of the first element and the second element according to another embodiment.
Figure 4A:
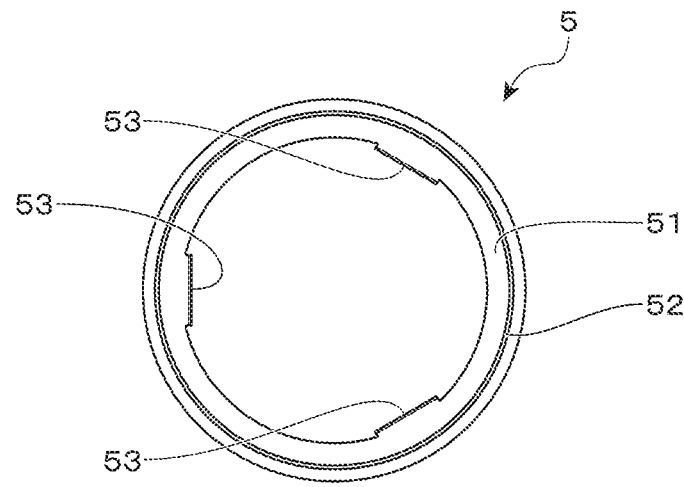
FIG. 4A is a front view.
Figure 4B:
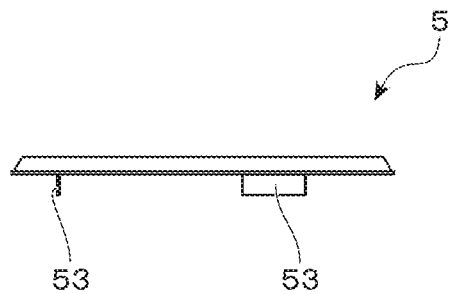
FIG. 4B is a side view.
Figure 4C:
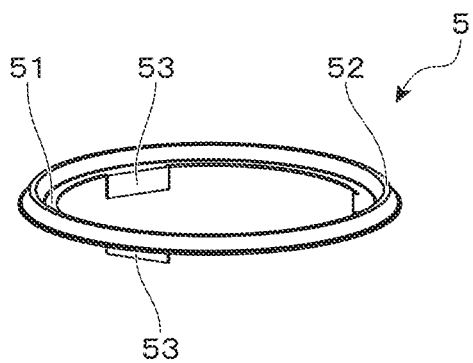
FIG. 4C is a perspective view as viewed from the front and FIG. 4D is a perspective view as viewed from a bottom surface.
Figure 4D:
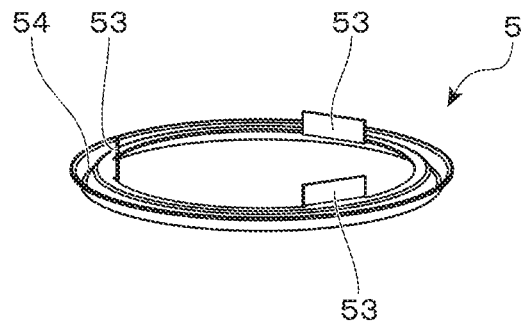
Figure 5A:
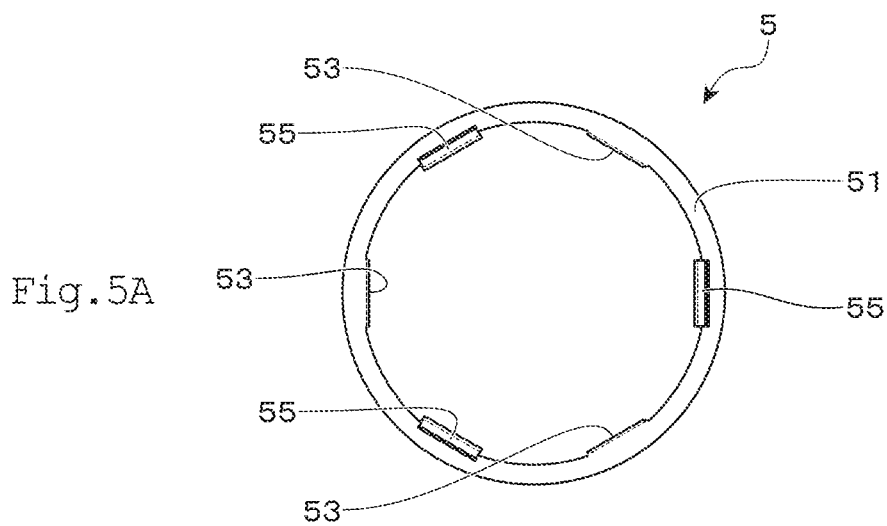
FIG. 5A is a front view.
Figure 5B:
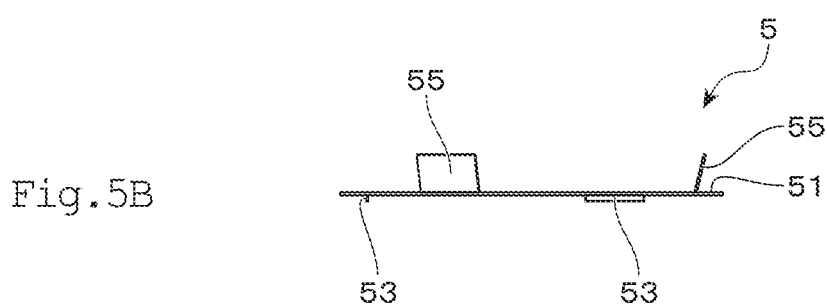
FIG. 5B is a side view.
Figure 5C:
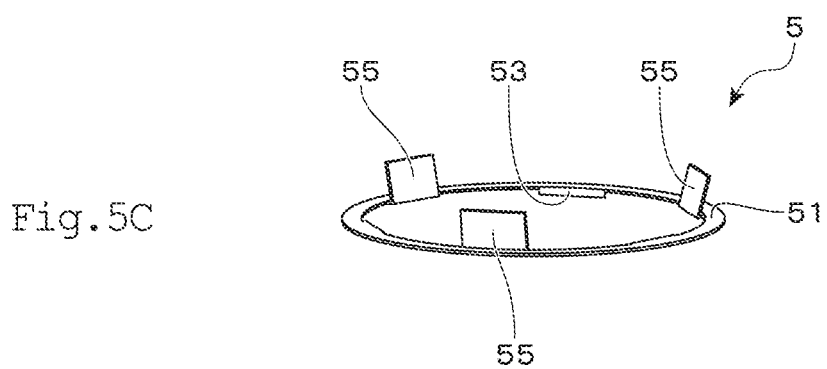
FIG. 5C is a perspective view as viewed from the front side.
Figure 5D:
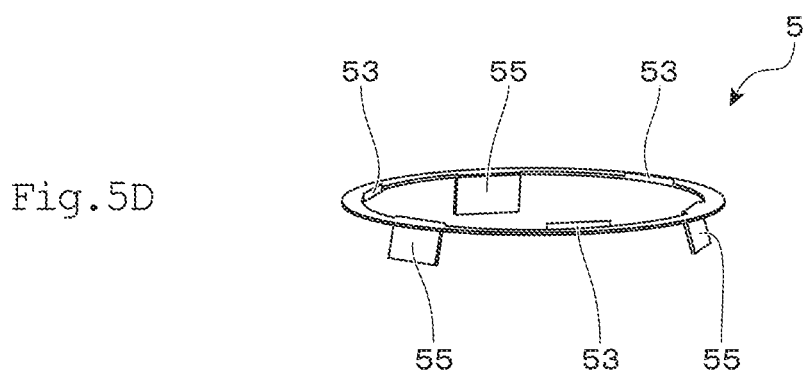
FIG. 5D is a perspective view as viewed from a bottom surface.
Figure 6B:
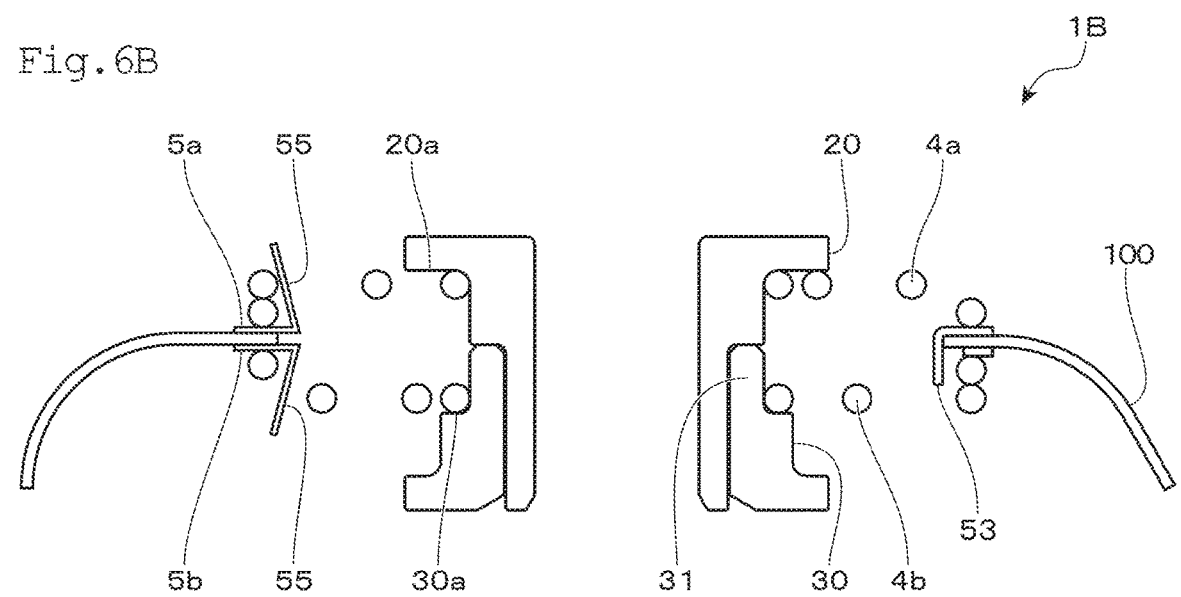
FIG. 6B is a cross sectional view of the connector 1B according to another embodiment.

Further, as other embodiments of the first element 2 and the second element 3, those having a shape shown in FIG. 3B and FIG. 6B can be adopted. In this embodiment, both have a rivet-like shape, and a hole 312 of the second element 3 is fitted to a stepped part 211 formed on the first element 2, whereby these elements are assembled into a bobbin-like shape.

As mentioned above, by assembling the first element 2 and the second element 3 into a bobbin-like shape, two surfaces 20a and 30a formed in the flange parts 20 and 30 of each element are disposed such that they are opposed to each other, and, by the body part 31, the two surfaces 20a and 30a are maintained in a specific distance (interval) capable of inserting the compression coil spring 4, the spacer 5 and the shielding body 100.

Each of the compression coil springs 4a and 4b has a through hole 40, and is a pressing member formed so as to be capable of extending and contracting by winding a prescribed wire material (for example, SUS304, φ1.0) spirally around this through hole 40 as center such that the curvature thereof varies continuously. In the no-load state, these springs have a predetermined height, but in the compressed state, it is deformed into a substantially flat shape.

The spacers 5a and 5b are formed of a metal such as iron and stainless steel, for example. These spacers are each an annular element that clamps the inner peripheral part of the mounting hole 103 formed in the shielding body 100 in the state where they are pinched between the compression coil springs 4a and 4b.

As shown in FIGS. 2 and 6A to 6B, these elements are assembled to have a configuration as the connector. Hereinbelow, an explanation will be made on the specific configuration and the functional role of each element, while explaining assembly procedure.

First, the compression coil spring 4b is attached to the second element 3. Attachment is conducted by insertion of the body part 31 into the through hole 40. At this time, insertion is conducted such that an end 41 of the large-curvature side of the compression coil spring 4b is directed to the flange part 30 side. Further, the diameter of the through whole 40 on the side of the end 41 is formed slightly larger than the outer diameter of the cylindrical part 31. As a result, movement of the compression coil spring 4b in the radial direction relative to the body part 31 is restricted.

Subsequently, a spacer 5b is mounted on the compression coil spring 4b.

As shown in FIG. 4A to 4D, the spacer 5b comprises a spring mounting part 51 and an annular convex part 52 formed on the outer periphery thereof, and is configured capable of accommodating the compression coil spring 4b on the inner periphery side of the annular convex part 52. By this annular convex part 51, positional aberration in the radial direction of the compression coil spring 4b relative to the spacer 5b can be restricted.

Subsequently, the shielding body 100 is mounted on the spacer 5b. In the spacer 5b, a plurality of wall parts 53 are formed. On the outside of the wall parts 53, the inner peripheral part of the mounting hole 103 is arranged. The outer diameter of a circle virtually connecting the plurality of wall parts 53 is formed slightly smaller than the diameter of the mounting hole 103. By these wall parts 53, positional aberration of the shielding body 100 in the surface direction relative to the spacer 5b can be restricted.

In the spacer 5b, an annular concave part 54 is formed, whereby the contact area with the shielding body 100 is reduced. On the side opposing to the spring mounting part 51 and facing the shielding body 100, an annular concave part (groove) can be provided (not shown).

Subsequently, the spacer 5a is mounted on the shielding body 100.

As in the case of the spacer 5b, the spacer 5a is provided with the spring mounting part 51, the annular convex part 52, the wall part 53 and the annular concave part 54, and is one obtained by simply mounting the spacer 5b upside down. In relationship with the shielding body 100, the wall part 53 functions to restrict positional aberration in the surface direction of the shielding body 100, and the annular concave part 54 functions to reduce the contact area of the shielding body 100.

Subsequently, the compression coil spring 4a is mounted on the spacer 5a.

While inserting the body part 31 into the through whole 40, the compression coil spring 4a is mounted such that an end 42 of the small-curvature side thereof contacts the spacer 5a. Similar to the spacer 5b, the spacer 5a comprises the spring mounting part 51 and the annular convex part 52 formed on the outer periphery thereof. Therefore, the compression coil spring 4a is accommodated on the inner peripheral side of the annular convex part 52, and by this annular convex part 52, positional aberration in the radial direction of the compression coil spring 4a relative to the spacer 5a can be restricted.

Subsequently, the first element 2 is engaged with the stepped part 311 of the second element 3, whereby assembling is completed.

In such assembled state, as shown in FIG. 6A to 6B, the wall parts 53 formed at each of the spacer 5a and the spacer 5b alternately intersect. By this configuration, the wall part 53 of the spacer 5a restricts positional aberration in the radial direction of the compression coil spring 4b and the wall part 53 of the spacer 5b restricts positional aberration in the radial direction of the compression coil spring 4a, respectively.

As another embodiment of the spacer 5, one having a shape shown in FIG. 5A to 5D and FIG. 6B can be adopted. In this embodiment, instead of the annular convex part 52, plural spring supporting parts 55 are provided. The outer diameter of a circle virtually connecting plural spring supporting parts 55 is formed slightly smaller than the diameter of the through whole 40 on the side of the end 42 of the compression coil spring 4. By this spring supporting part 55, positional aberration of the compression coil spring 4 in the radial direction relative to the spacer 5 can be restricted. Further, the spring supporting part 55 is formed such that it can be bent outward. Thereby, the spacer 5 and the compression coil spring 4 can be integrally assembled in advance, and as a result, improvement in efficiency in assembly work can be realized.

Figure 8:
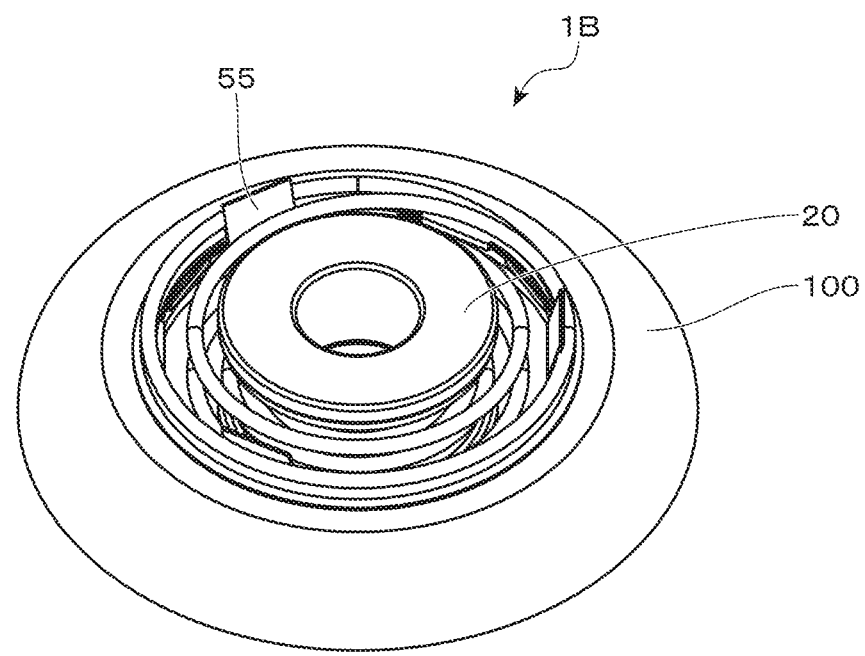
FIG. 8 is a perspective view of the connector 1B (including part of the shielding body) according to another embodiment.

Meanwhile, one assembled by using another embodiment of the first element 2 and the second element 3 mentioned above and another embodiment of the spacer 5 is a connector 1B shown in FIG. 6B, FIG. 7B and FIG. 8.

Regarding the thus assembled connector 1, as shown in FIG. 2, a bolt 150 is passed through the hole 312 from the first element 2 side and the threaded portion 151 of the bolt 150 is screwed into the fixing hole 11 formed in a vibrating body 10 such as an engine, whereby the shielding body 100 is mounted on the vibrating body 10 through the connector 1.

Due to such a configuration, the connector 1 operates as mentioned below, and actively absorbs vibration generated from the vibrating body 10, whereby transmission of vibration to the shielded body 100 is suppressed.

Since the first and second elements 2 and 3 are fixed to the vibrating body 10, vibration from the vibrating body 10 is directly transmitted thereto. That is, the first and second elements 2 and 3 vibrate together with the vibrating body 10.

As shown in FIG. 6A to 6B, the outer diameter of each of the flange parts 20 and 30 is formed smaller than the diameter of the through hole 40 on the side of the end 42 of the compression coil spring 4, the inner diameter of the spacer 5 and the diameter of the mounting hole 103, and as a result, a sufficiently motion space capable of moving the flange parts 20 and 30 is provided between the flange parts 20 and 30, and the spacer 5 and the shielded body 100. As a result, since there is no fear that the flange parts 20 and 30 interfere them, vibration from the first and second elements 2 and 3 is not directly transmitted to the shielding body 100. Further, the distance between the bottom surface of the flange part 30 and the shielding body 100 (distance in the height direction in FIG. 6A to 6B) is set to be equal to or larger than the amplitude of the vibrating body 10. Thereby, the vibrating body 10 that is vibrating does not interfere the shielding body 100.

Due to such a configuration, transition of vibration from the vibrating body 10 to the shielding body 100 transmits only through the compression coil spring 4. Although the compression coil spring 4 expands and contracts in accordance with vibration of the first and second elements 2 and 3, inertia to keep it in the stationary state is acted on the shielding body 100 and hence, only the compression coil spring 4 expands and contracts. That is, vibration transmitted to the shielding body 100 is absorbed by the compression coil spring 4, whereby transmission of vibration to the shielding body 100 is suppressed.

In particular, since the compression coil spring 4 is a compression coil spring of which the curvature continuously varies, it can be deformed to an extent that the position of the end 41 and the end 42 are exchanged between an unloaded state and a loaded state, and hence a sufficient amount of deformation relative to the winding (height) direction of the spring can be ensured. At the same time, it can be deformed in the radial direction, and transmission of vibration to the shielding body 100 can be suppressed without fail.

Further, heat from the vibrating body 10 is transmitted to the shielding body 100 through the spacer 5. In the case where the spacer 5 and the shielding body 100 are formed of metals having same compositions (heat conductivity), when a load is applied in the state where heat is applied, there is fear that the shielding body 100 is broken. Contrary, in the case where the spacer 5 and the shielding body 100 are formed of metals having different compositions (heat conductivity) (e.g. the spacer 5 is formed of stainless steel and the shielding body 100 is formed of aluminum), heat conductance is suppressed and the shielding body 100 is hardly broken.

Figure 9:
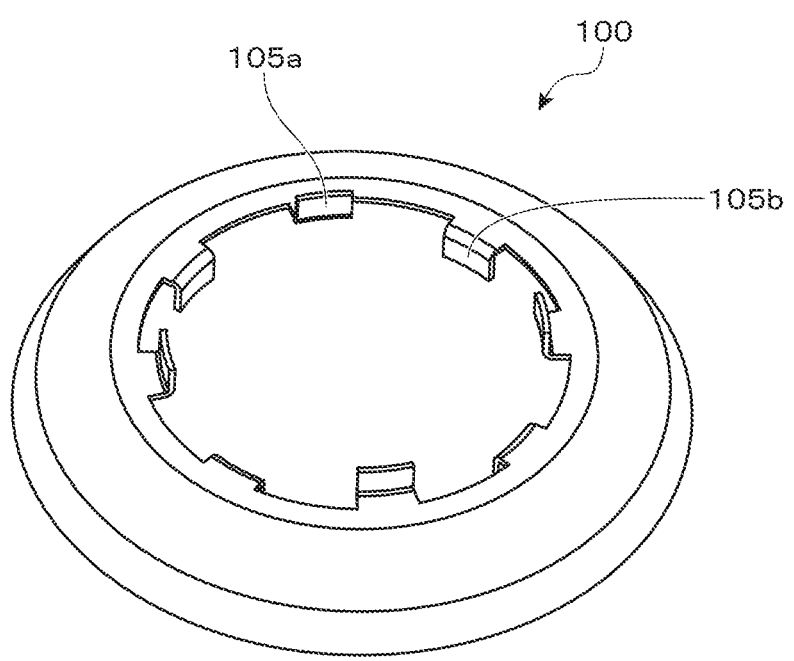
FIG. 9 is a perspective view showing the peripheral part of the mounting hole of the shielding body according to another embodiment.

In this embodiment, the spacer 5 is disposed between the compression coil spring 4 and the shielding body 100. Alternatively, a configuration is possible in which the shielding body 100 is directly clamped by the compression coil spring 4a and the compression coil spring 4b without disposing the spacer 5 between the compression coil spring 4 and the shielding body 100. In this case, as shown in FIG. 9, on the periphery of the mounting hole 103 of the shielding body 100, spring restricting parts 105a and 105b that exhibit similar functions as those of the annular convex part 52 or the spring supporting part 55 provided on spacer 5 can be provided. As a result, positional aberration in the surface direction of the shielding body 100 relative to the compression coil springs 4a and 4b is restricted.

Hereinbelow, the dimension of each part of the connector 1B will be specifically given.

In the table shown in FIG. 7C, design values are given as the dimensions corresponding to each of the symbols A to L shown in FIGS. 7A to 7B.

The design values almost correspond to the actual dimensions of the connector 1B produced as a product, and these design values are merely one value selected from a preferable numerical value range. It is needless to say that other design values can be adopted.

For example, it is preferred that the distance B between the two surfaces 20a and 30a be equal to or larger than the value obtained by adding the height of the compression coil spring 4a and 4b when compressed (e.g. 4 mm (2 mm×2)), the thickness of the spacer 5a and 5b (K×2) and the thickness of the shielding body 100 (L).

In addition, it is preferred that the distance C from the vibrating body 10 (mounting surface of the connector B) to the surface 30a be 3.0 mm or more.

Further, it is preferred that the difference G obtained by deducting the outer radius of the flange parts 20 and 30 from the inner radius of the spacer 5 be 3.0 mm or more.

It is preferred that the height in the non-load state of the compression coil spring 4 be equal to or larger than a value obtained by adding 3.0 mm to the height in the compressed state (e.g. 2 mm).

Specific numerical values are set for parts where no numerical values are indicated in the column of design values in the table. However, in order to avoid restrictive interpretation, design values are indicated as "appropriate" for the sake of convenience.

Hereinbelow, connectors 1C to 1E according to other embodiments of the present invention, which are connectors having forms different from those of the above-mentioned connectors 1A and 1B, will be exemplified.

Figure 10:
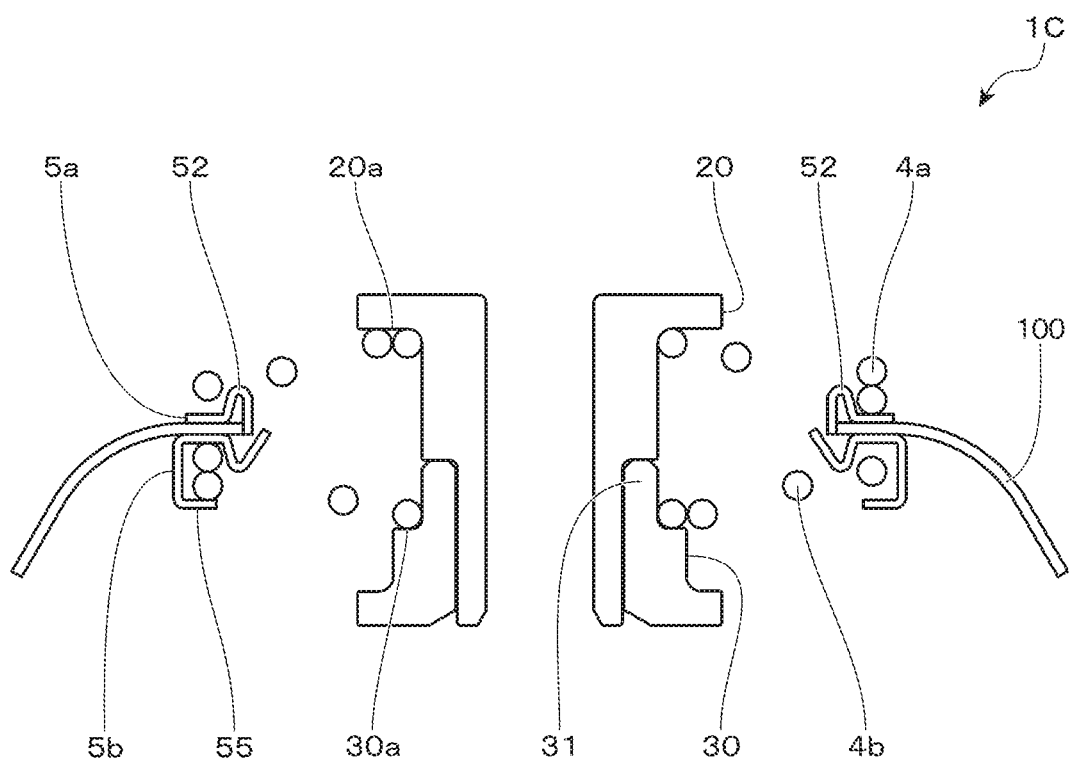
FIG. 10 is a cross sectional view of the connector 1C according to another embodiment.

The connector 1C shown in FIG. 10 is a modification embodiment of the connector 1B, and differs from the connector 1B in shape of the spacer 5. Specifically, the connector 1C differs from the connector 1B in shape of the spring supporting part 55 (an approximately U-shape with the opening directed to the center of the spacer) and in provision position thereof (it is formed on the outer periphery of the spacer), and also differs in that, in addition to the spring supporting part 55, it is provided with the annular convex part 52 (on the inner periphery of the spacer).

Figure 11A:
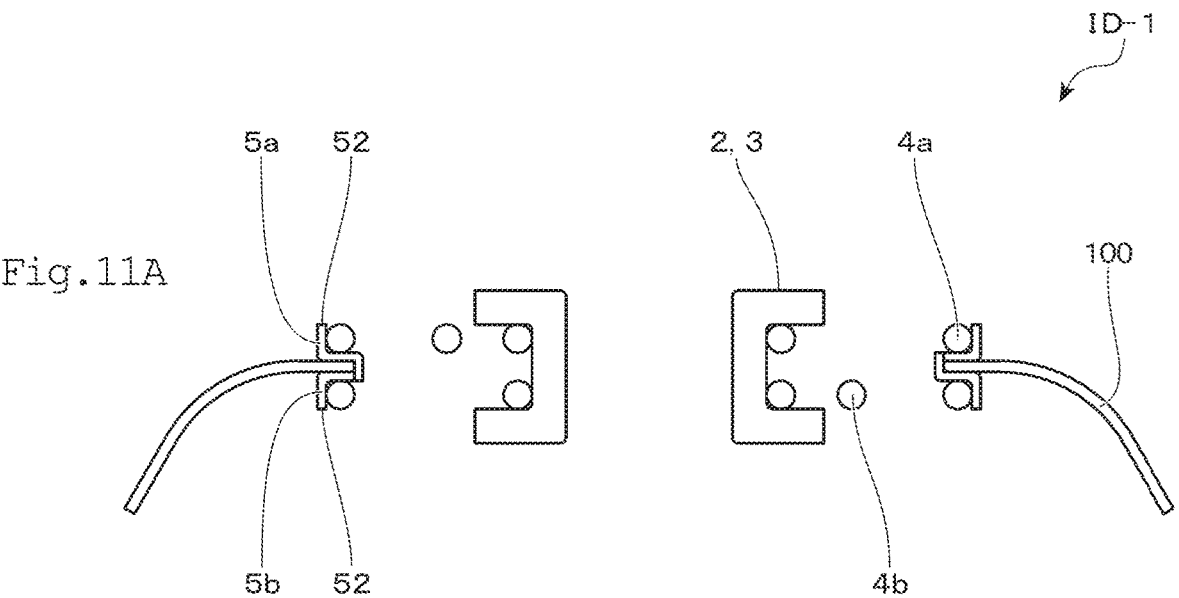
FIG. 11A is a cross sectional view of the connector 1D-1 (including a spacer) and FIG. 11B is a cross sectional view of the connector 1D-2 (not including a spacer)

The connector 1D-1 shown in FIG. 11A is a modification embodiment of the connector 1A, and differs from the connector 1A in shape of the annular convex part 52 (allowing the spacer to have an L-shaped cross section).

Figure 11B:
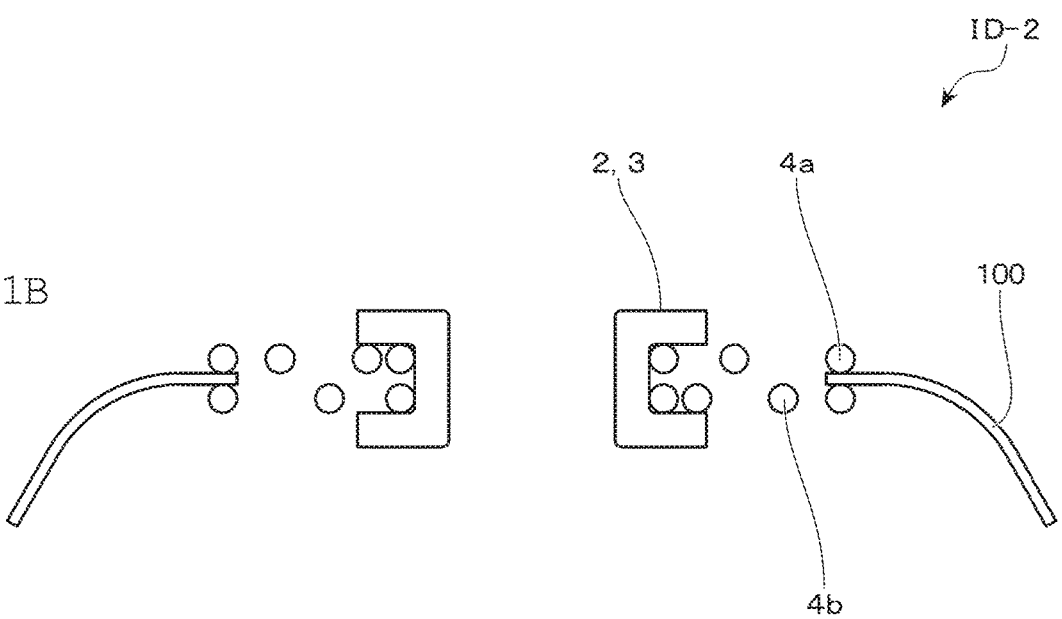

Further, the connector 1D-2 shown in FIG. 11B is an embodiment in which the spacer 5 is removed from the connector 1D-1. In this example, in order to restrict positional aberration in the surface direction of the shielding body 100 relative to the compression coil spring 4, it is preferred that the spring restricting parts 105a and 105b shown in FIG. 9 be provided on the periphery of the mounting hole 103 of the shielding body 100.

The connector 1E-1 shown in FIG. 12A is a modification embodiment of the connector 1A, and differs from the connector 1A in shape of the annular convex part 52 (allowing the spacer to have an L-shaped cross section), and also differs from the connector 1A in magnitude relationship between the outer diameter of each of the flange parts 20 and 30 and the inner diameter of the spacer 5 and the diameter of the mounting hole 103.

In this example, the inner diameter of the spacer 5 and the mounting hole 103 are made smaller than the outer diameter of each of the flange parts 20 and 30.

The connector 1E-2 shown in FIG. 12B is an embodiment in which the spacer 5 is excluded from the connector 1E-1. In this example, also, in order to restrict positional aberration in the surface direction of the shielding body 100 relative to the compression coil spring 4, it is preferred that the spring restricting parts 105a and 105b shown in FIG. 9 be provided on the periphery of the mounting hole 103 of the shielding body 100.

It is needless to say that the connectors 1C to 1E having such form are one embodiment of the connector according to the present invention. Meanwhile, since the shapes of the first and second elements 2 and 3 can be appropriately selected from arbitrary shapes, they are schematically shown in the connectors 1D and 1E.

[Shielding Body]

Figure 13:
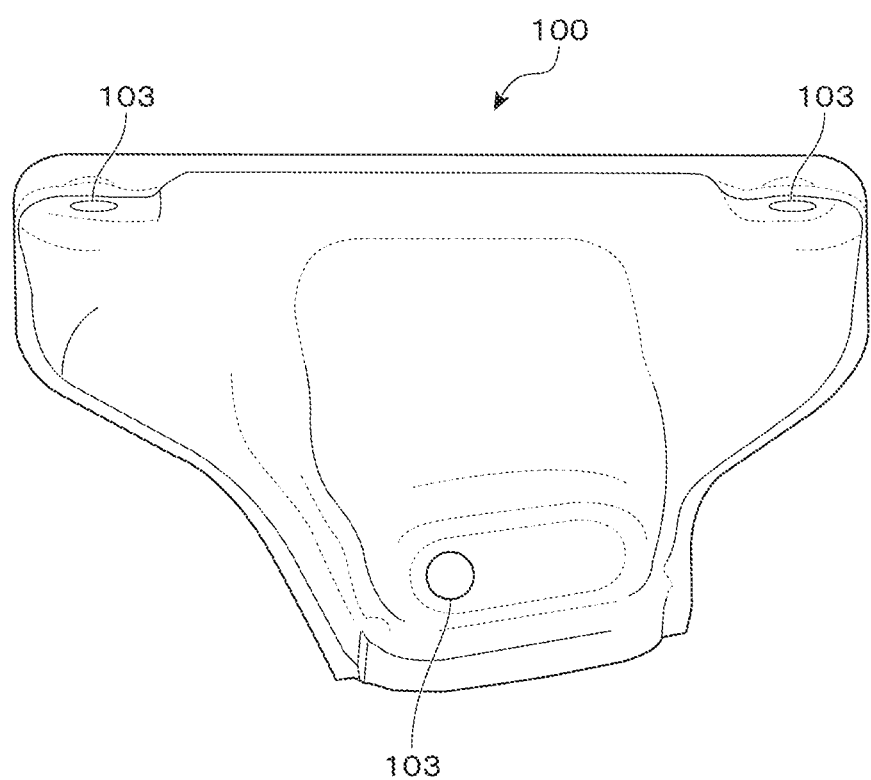
FIG. 13 is a perspective view of the shielding body.

As shown in FIG. 13, the shielding body 100 is formed by molding prescribed metal plates into a shape that conforms to the outer shape of the vibrating body 10 to be covered.

The shielding body 100 according to the present embodiment has a double layer structure in which two metal plates are stacked, for example. Between these two metal plates, a prescribed heat insulator or the like can be disposed. A configuration may be possible in which nothing is disposed between the two metal plates.

It is preferred that the metal plates be formed of a metal that is different from that used for the spacer 5. For example, when the spacer 5 is formed of iron or stainless steel, the metal plate may be made of aluminum.

Further, it is preferred that the surface of the metal plate be processed to have a concavo-convex shape.

The thus configured shielding body 100 has the mounting hole 103. By attaching the connector 1 such that the peripheral part of this mounting hole 103 is clamped between the spacers 5a and 5b, the shielding body 100 in which the shielding body 100 and the connector 1 are integrated is finished.

This finished product is to be fixed to the vibrating body 10 such as an engine via the connector 1, and due to the action of the connector 1, transmission of vibration generated by the vibrating body 10 to the shielding body 100 is suppressed.

As explained above, according to the connector and the shielding body of the present embodiment, vibration generated by the vibrating body is actively absorbed, whereby transmission of vibration to the shielding body can be suppressed.

Hereinabove, the preferred embodiments of the connector and the shielding body of the present invention are explained. The connector and the shielding body according to the present invention are not restricted to the above-mentioned embodiment, and it is needless to say that various modifications are possible within the scope of the present invention.

For example, as for the connector 1, vibration absorption properties can be adjusted by appropriately changing the material, mass, size, spring properties (for example, spring constant, number of turns, wire diameter, etc.) of each element in accordance with the size and mass of the shielding body 100, and the number of connecting parts, etc.

Basic data relating to the absorption properties of vibration of the connector 1 according to the present invention are disclosed below.

As the basic data, for example, the spring constant of the compression coil spring 4 used in this embodiment and vibration damping properties, vibration control properties and vibration sound output properties obtained by the connector are disclosed.

[Spring Constant]

As the compression coil spring 4, one that is made of stainless steel, has an inner diameter of the end 41 on the large-curvature side of the coil of 11 mm, an outer diameter of the end 42 on the small-curvature side of the coil of 28 mm, a height in the non-load state of 6 mm, a wire diameter of 1 mm and an effective number of winding of 1 was used.

Figure 14A:
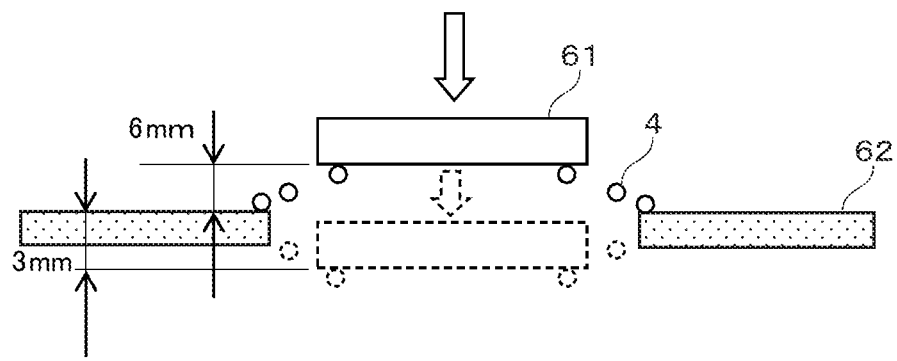
FIG. 14A is a cross sectional view showing the method for measuring the spring constant and FIG. 14B is a view showing the results of measuring the spring constant.

The spring constant was measured by the method shown in FIG. 14A (according to JIS B2704-1).

Specifically, the compression coil spring 4 was mounted on a mounting part 62 having a through hole having a diameter of 24 mm, and a movable part 61 having a diameter of 18 mm was lowered from the side of the end 41, thereby to compress the compression coil spring 4.

At this time, the repulsive force (load) of the compression coil spring 4 was measured by a load transducer (load cell) provided on the surface opposing to the compression coil spring 4 (lower surface) of the movable part 61.

The movable part 61 was gradually lowered from a point, as the starting point, that is 6 mm high in the non-load state, and was moved to a point exceeding a compression state at which the compression coil spring 4 became almost flat and, further, to a point 3 mm below where the end 41 and the end 42 were turned upside down.

Figure 14B:
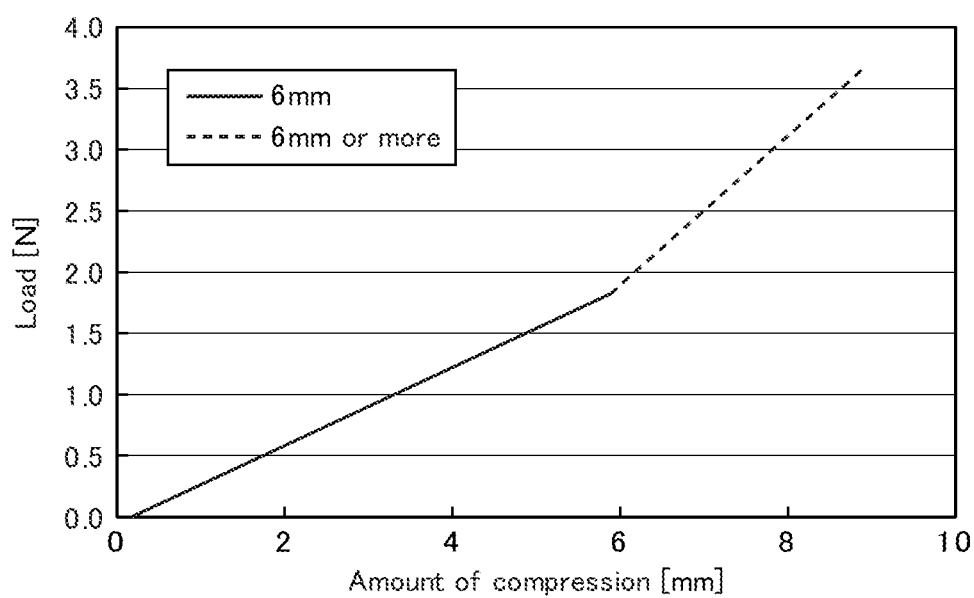

The relationship between the load (repulsive force) and the compression amount (amount of movement of the movable part 61) measured by this method is shown in FIG. 14B.

From this relationship, it can be understood that the spring constant from the non-load state to the compressed state was about 0.3 N/mm and the spring constant in the state where the end 41 and the end 42 were reversed exceeding a compression state was about 0.6 N/mm.

Such spring constant can be adopted as an optimum value, but is merely one value selected from the preferable numerical range. The preferable numerical range can be 0.1 to 10 N/mm including the above-mentioned values.

In the case of using the compression coil spring 4 having a spring constant outside the preferable numerical range, for example, when the spring constant is less than 0.1 N/mm, it is too soft to lose firmness, and as a result, it becomes difficult to avoid interference with other components during vibration, when the spring constant exceeds 10 N/mm, it is too stiff, and as a result, there is fear that vibration may be directly transmitted to the shielding body 100, and hence advantageous effects of the present invention cannot be obtained.

[Vibration Damping Properties]

Figure 15A:
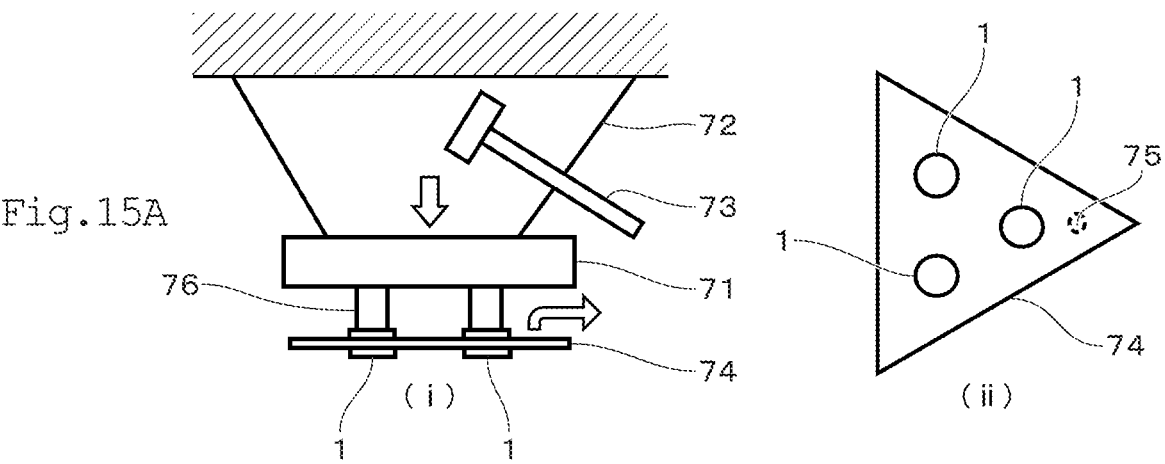
FIG. 15 (15A to 15C) is an explanatory view relating to the vibration damping properties of the specimen attached to the object to be hit through the connector, in which FIG. 15A (i) is a side view showing the method for measuring vibration damping properties, FIG. 15A (ii) is a front view of the specimen.
FIG. 15B is a view showing the results of measuring the vibration damping properties and FIG. 15C is an explanatory view of the full width at half maximum method.

Vibration damping properties were measured by the method shown in FIG. 15A.

This method utilizes "Test methods for vibration-damping property in laminated damping steel sheets of constrained type" (JIS G0602-1993).

Specifically, to an object to be hit 71 hung by a thread 72 (has the similar outer shape as that of a specimen 74), a specimen 74 was attached through the connector 1 (1B), and the object to be hit 71 was hit and vibrated by the hammer 73. Vibration characteristics that were output from an acceleration sensor (acceleration pickup) attached to a measurement point 75 of the specimen 74 (aluminum plated steel plate 150 mm×150 mm×150 mm×0.4 t) were measured. While the connector 1 is integrally fixed to the object to be hit 71 by a fixture 76 such as a volt, the specimen 74 is indirectly attached to the object to be hit 71 through the connector 1.

Figure 15B:
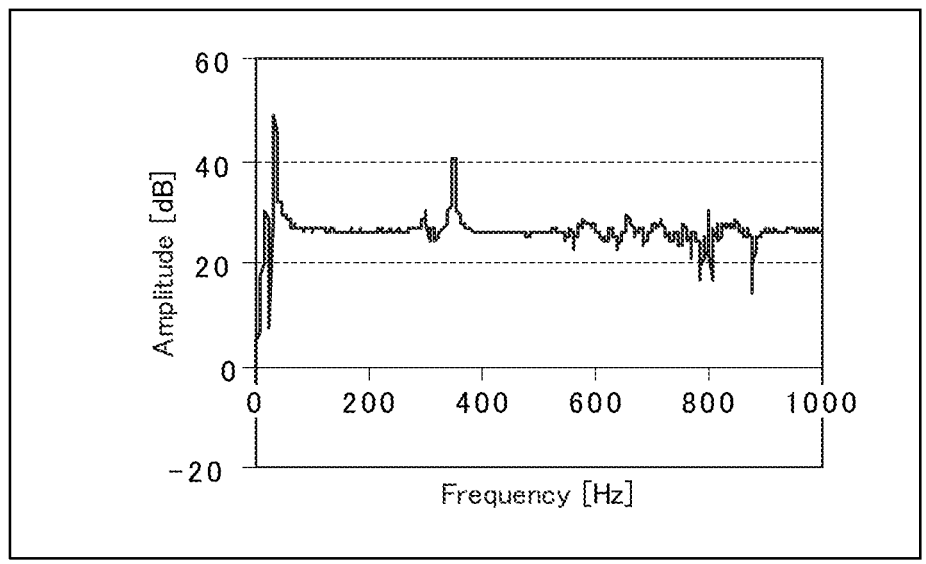
Figure 15C:
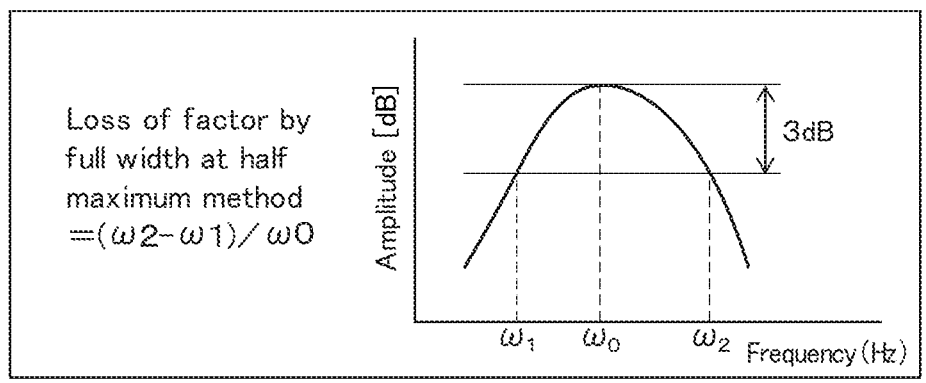

The relationship between the amplitude of the measurement point 75 measured by this method and the frequency is shown in FIG. 15B.

From this relationship, loss factor is obtained as an index showing vibration characteristics. As for the loss factor, at the resonant peak, a loss factor of 0.07 was calculated by the full width at half maximum method shown in FIG. 15C.

The loss factor has properties that the vibration damping effect becomes high with an increase in loss factor. Since the loss factor when the specimen 74 is attached to the object to be hit 71 without disposing the connector 1 was 0.006, it was confirmed that transmission of vibration is suppressed by the connector 1 (1B).

[Vibration Control Properties]

The shielding body 10 was attached to an actual engine, and the degree of absorption by the connector 1 (1B) of vibration transmitted from an engine was measured.

The exhaust manifold part attached to the 4-cylinder in-line engine was mounted so as to be covered by the shielding body 10, and vibration of engine (acceleration) and vibration of the shielding body 10 (acceleration) were measured while changing the engine revolutions in a range of 1,000 to 6,000 rpm.

Measurement of vibration was conducted as follows. By attaching an acceleration sensor (acceleration pickup) to each of the exhaust manifold and the shielding body 10, the properties of vibration output therefrom were measured.

Figure 16A:
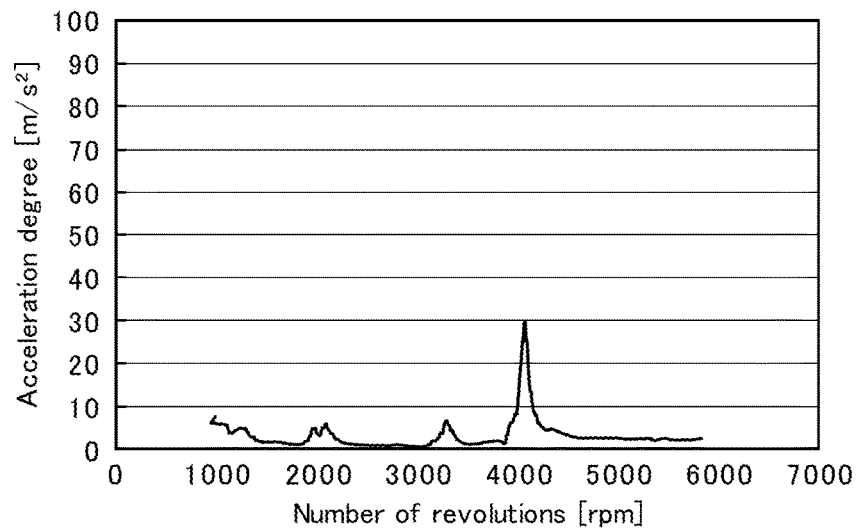
FIG. 16A is a view showing the relationship between the number of revolutions of an engine and vibration (acceleration) and FIG. 16B is a view showing the relationship between the number of revolutions and the vibration sound.

FIG. 16A is a graph showing the relationship between the engine revolutions and the vibration (acceleration) of the shielding body 10.

The maximum value (acceleration) of the vibration of the shielding body 10 was 32 m/s$^2$, while the maximum value (acceleration) of the vibration of the exhaust manifold was 110 m/s², it was confirmed that transmission of vibration could be suppressed by the connector 1 (1B).

[Vibration Sound Output Properties]

As in the case of vibration control properties, the shielding body 10 was attached to an actual engine, and vibration sound (sound pressure level) directly emitted from engine and vibration sound (sound pressure level) indirectly emitted through the shielding body 10 were measured.

A microphone was installed at a position remote for a specific distance (e.g. 100 mm) from the engine and the shielding body 10, and vibration sound from the engine and the shielding body 10 were measured.

Figure 16B:
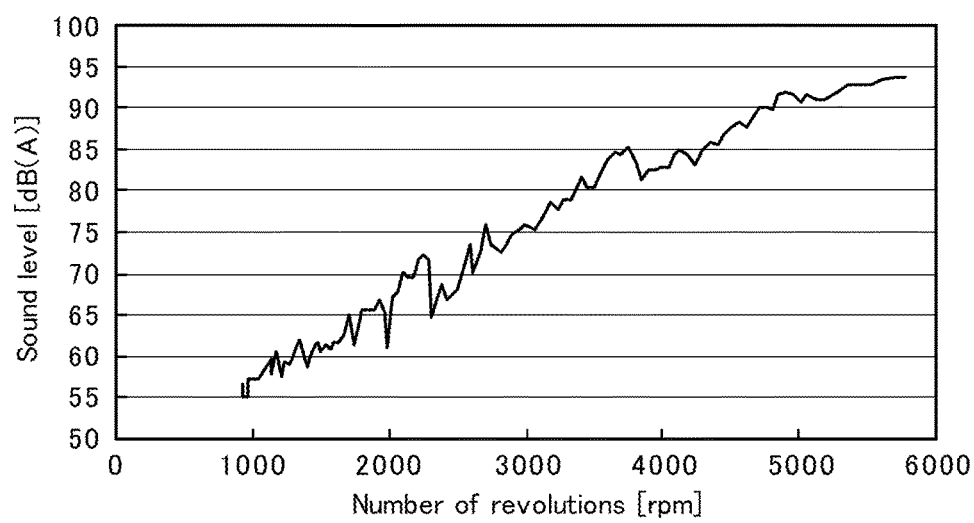

FIG. 16B is a graph showing the relationship between the number of engine revolutions and the vibration sound from the shielding body 10 (sound pressure level).

For example, when comparison is made in terms of OA (overall) value to the number of revolutions of engine of 4000 rpm, the vibration sound from the shielding body 10 was 85.4 dB, while the vibration sound from the engine was 86.5 dB. It was confirmed that the vibration sound was suppressed by the connector 1 (1B).

The documents described in the specification and the specification of Japanese application(s) on the basis of which the present application claims Paris convention priority are incorporated herein by reference in its entirety.

INDUSTRIAL APPLICABILITY

The present invention can be used widely in a shielding body that shields specific physical energy emitted from an engine, and an exhaust manifold or a turbocharger which is attached to the engine, etc., and a connector provided in a connecting segment that connects them and the shielding body.

EXPLANATION OF NUMERICAL SYMBOLS 1. (1A, 1B, 1C, 1D, 1E) Connector
2. First element (first surface)
3. Second element (second surface, holding part)
4. Compression coil spring (pressing member)
5. Spacer (annular element)
52. Annular convex part
53. Wall part
54. Annular concave part
55. Spring supporting part
100. Shielding body
103. Mounting hole
105. Spring restricting part
150. Bolt

The invention claimed is:

1. A connector connecting a vibrating body that generates vibration and a plate-like shielding body that shields physical energy emitted from the vibrating body, the connector comprises:

a first element having a flange part that provides a first surface;

a second element having a flange part that provides a second surface, and assembled into a bobbin-like shape with the first element such that the first and second surfaces are disposed opposingly with an interval therebetween; and a pressing member having a through hole and formed so as to be capable of extending and contracting by winding a prescribed wire material spirally around the through hole as center such that a curvature thereof varies continuously around the through hole and the curvature of one end side in an extension and contraction direction is larger than the curvature of the other end side; wherein the assembled first and second elements provide a holding part that is inserted into the pressing member and maintains a specific distance between the first and second surfaces;

the pressing member comprises:

a first pressing member disposed such that a large-curvature side thereof faces the first surface, wherein a diameter of the through hole on a small-curvature side opposite to the large-curvature side is larger than an outer diameter of the flange part that provides the first surface; and a second pressing member disposed such that a large-curvature side thereof faces the second surface, wherein a diameter of the through hole on a small-curvature side opposite to the large-curvature side is larger than an outer diameter of the flange part that provides the second surface; and the connector is configured that the first and second pressing members are disposed such that the small-curvature sides thereof face the shielding body, and clamp, directly or through a spacer, an inner peripheral part of a hole formed in the shielding body with larger diameter than the outer diameter of the flange parts that provide the first and second surfaces.

2. The connector according to claim 1, which comprises:

a first annular element and a second annular element contacting with the small-curvature sides of the first pressing member and the second pressing member respectively as the spacer, wherein the first and second annular elements are provided with a first restricting means that is engaged with the first pressing member and the second pressing member respectively to restrict positional aberration of the first pressing member and the second pressing member in a radial direction, and a second restricting means that is engaged with the shielding body to restrict positional aberration of the shielding body in a surface direction.

3. A shielding body attached to a vibrating body that generates vibration and shields prescribed physical energy emitted from the vibrating body, comprising the connector according to claim 1.

4. A shielding body attached to a vibrating body that generates vibration and shields prescribed physical energy emitted from the vibrating body, comprising the connector according to claim 2.

* * * * *